United States Patent [19]

Welles et al.

[11] Patent Number: 4,851,908
[45] Date of Patent: Jul. 25, 1989

[54] FIELD NUMBER DOUBLING CIRCUIT FOR A TELEVISION SIGNAL

[75] Inventors: Petrus W. G. Welles; Frits A. Steenhof, both of Eindhoven, Netherlands

[73] Assignee: U.S. Philips Corporation, New York, N.Y.

[21] Appl. No.: 178,741

[22] Filed: Apr. 7, 1988

[30] Foreign Application Priority Data

Apr. 16, 1987 [NL] Netherlands .................. 8700902

[51] Int. Cl.⁴ .................................. H04M 7/01
[52] U.S. Cl. .................................. 358/140; 358/152
[58] Field of Search .................. 358/140, 152

[56] References Cited

U.S. PATENT DOCUMENTS

| | | | |
|---|---|---|---|
| 4,587,557 | 5/1986 | Doornhein | 358/140 |
| 4,604,651 | 8/1986 | Frencken | 358/140 |
| 4,684,986 | 8/1987 | Steenhof | 358/148 |
| 4,701,793 | 10/1987 | Den Hollander | 358/140 |
| 4,724,485 | 2/1988 | Golab | 358/140 |
| 4,740,842 | 4/1988 | Annegarn | 358/140 |

Primary Examiner—Howard W. Britton
Attorney, Agent, or Firm—Edward W. Goodman

[57] ABSTRACT

A field number doubling circuit has a measuring circuit (25) for determining the starting instant of a second read operation of a memory circuit (3) with respect to that of a first read operation in such a way that a display of a field number doubled television signal, even for a non-standard television signal to be doubled in field number, does not exhibit any flicker at the field frequency of the last-mentioned signal. Furthermore, the measuring circuit can determine the most favorable waiting period (B) between a write operation and a first read operation, the waiting period (A) between a vertical synchronizing pulse (V) and the start of a memory write operation, and a value for the waiting period (C) between the start of a memory read operation and the start of vertical deflection of a picture display section (13). A counter circuit (29) which can be controlled by means of the measuring circuit is provided for the controllable periods.

10 Claims, 7 Drawing Sheets

FIELD NUMBER DOUBLING CIRCUIT FOR A TELEVISION SIGNAL

BACKGROUND OF THE INVENTION

The invention relates to a field number doubling circuit for a television signal, comprising a memory circuit which can be written at the field frequency of the television signal to be doubled in field number and can be read at the double field frequency thereof, vertical synchronizing signals for a picture display section for displaying a television signal doubled in field number being derived by means of a controllable counter circuit from vertical synchronizing signals of the television signal to be doubled in field number for obtaining a vertical synchronizing signal pattern in which a vertical frequency component of the television signal to be doubled in field number is reduced. A field number doubling circuit of the type described above is known from European Patent Application No. 109,099, corresponding to U.S. Pat. No. 4,587,557. As is shown in FIG. 5 of this patent application, a first read operation of the memory circuit in this circuit is started at the end of a write operation and a second read operation is started at an instant which for a nominal television signal is halfway between the end of a write operation and the start of the next write operation. A field frequency component in the vertical synchronising pattern of the picture display section is reduced thereby so that a display with reduced flicker occurs.

SUMMARY OF THE INVENTION

An object of the invention is to provide a field number doubling circuit which reduces the field frequency component to a further extent and which in a given construction is better suitable for use of field memories of the so-called charge-coupled type.

To this end a field number doubling circuit of the type described in the opening paragraph is characterized in that the counter circuit comprises at least one counter which is controllable by means of a measuring circuit for obtaining a delay between the start of a first read operation and the start of a second read operation which is substantially equal to half the field period of the television signal to be doubled in field number, while the measuring circuit is adapted to measure at least the duration of the fields of the television signal to be doubled in field number or the difference of the duration thereof with respect to a standard duration and to derive a value therefrom for the control of the controllable counter and to apply said value to said counter.

Due to this measure a completely regular read out of the memory circuit is obtained, even with non-standard television signals, so that a flickering phenomenon at the field frequency of the signal to be doubled in field number no longer occurs.

BRIEF DESCRIPTION OF THE DRAWINGS

The invention will now be described in greater detail with reference to the accompanying drawings, in which.

Corresponding components always have the same reference numerals in all Figures.

DETAILED DESCRIPTION OF THE INVENTION

Figure 1:
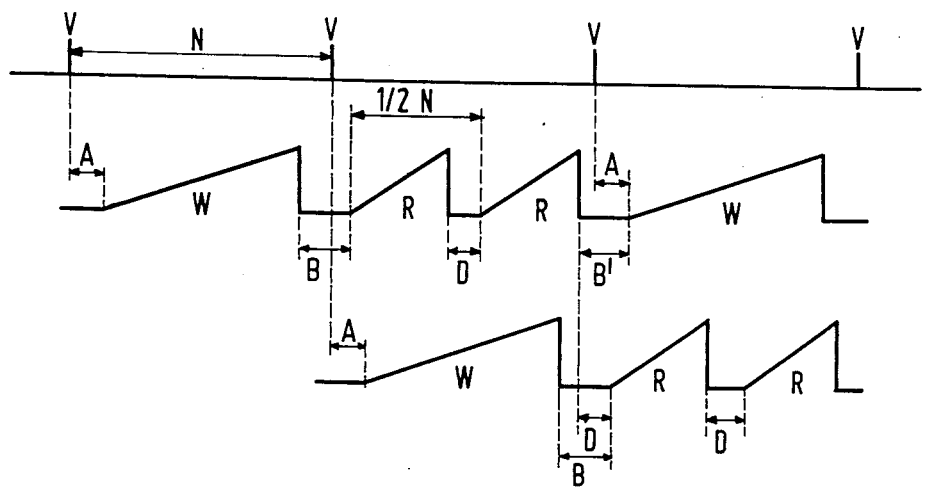
FIG. 1 illustrates by way of a time diagram the writing and reading of two field memories in a field number doubling circuit according to the invention.

In the uppermost waveform of FIG. 1, the instants are shown at which the vertical synchronizing signals V occur in a television signal to be doubled in field number, in the middle waveform the write, waiting and read periods of one of the two field memories of a memory circuit for the field number doubling operation and in the lowermost waveform the write, waiting and read periods of the other one of the two field memories.

The period between the occurrence of two vertical synchronizing signals takes N units of time, the waiting period between the occurrence of a vertical synchronizing signal V and the start of a write period of W units of time of a field memory indicated in the middle waveform takes A units of time, the waiting period between the end of a write period and the start of a first read period of R units of time takes B units of time, the waiting period between the first read period and a second read period also of R units of time takes D units of time and the waiting period between the second read period and the start of the next write period of W units of time takes B' units of time.

According to the invention, the duration of a period between the start of two successive read operations of the field memory may be rendered equal to $\frac{1}{2}N$ units of time which is half the duration of the field period of the television signal to be doubled in field number. All periods D then have the same duration and furthermore the waiting periods B and B' may be rendered equal to each other in order to shorten the maximum waiting period of a field memory as much as possible, which is favorable for memories of a charge-coupled type.

Figure 2:
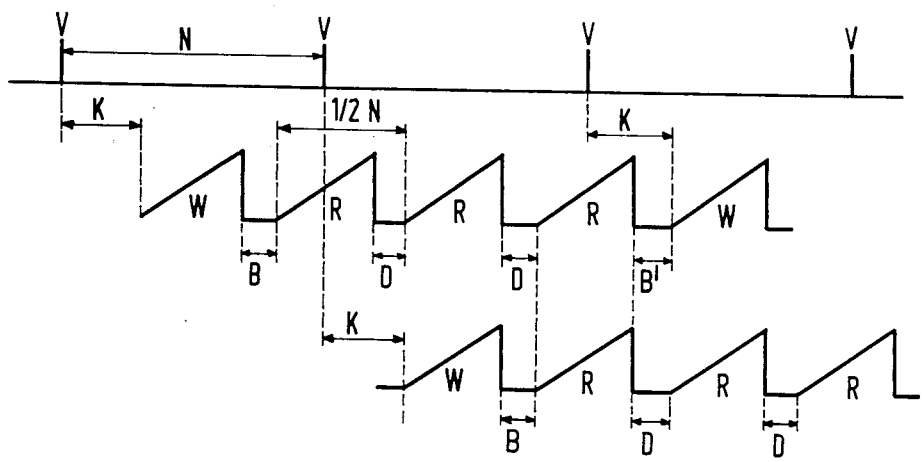
FIG. 2 illustrates by means of a time diagram the writing and reading of two field memories in a field number doubling circuit according to the invention by which also a picture section magnification is obtained.

The middle and lowermost waveforms in FIG. 2 differ from those in FIG. 1 because they relate to a so-called zoom circuit in which three read periods R occur after a write period W, and in which the third read perid does not serve for the display of the television signal which has been read, but for a circulation and for replacing half the information in the relevant field memory by that from the other field memory as described in the Netherlands Patent Application No. 8204728 corresponding to U.S. Pat. No 4,604,651. The third read period of the one field memory then coincides with the first read period of the other field memory.

The waiting period between a vertical synchronizing signal V and the subsequent write operation of a field memory takes K units of time in this case, with K being adjustable in order to choose the picture section which must be displayed in a magnified form and at the double field frequency.

In the case of FIG. 1, the waiting period A is preferably chosen to be such that $A+W \leq N$ in order to obtain a simple memory circuit, and furthermore, A is chosen to be such that most information which is unimportant for the display is not stored in the memory circuit.

When using field memories of the charge-coupled type, the duration of the write period W is determined by the length of the memory and then corresponds to a given number of line periods of the television signal to be doubled in field number. If random-access type field memories are used, the duration of the write period W can also be chosen.

No further indication has been given in the foregoing with respect to the units of time in which the duration of the different periods are expressed. These relate to the practical structure of the circuit. For example, all units of time may be expressed in line periods of the television signal to be doubled in field number, as exemplified by the circuits of FIGS. 3, 5, 6 and 7, or in line periods of the television signal doubled in field number. If some units of time are expressed in line periods of the television signal to be doubled in field number and others are expressed in line periods of the television signal doubled in field number, these should be reckoned with the fact that the ratio between these two kinds of line periods may vary as is, for example, the case in a field number doubling of a television signal obtained from a video recorder. Examples thereof are given in FIGS. 4, 6, 8, 9 and 10.

Figure 3:
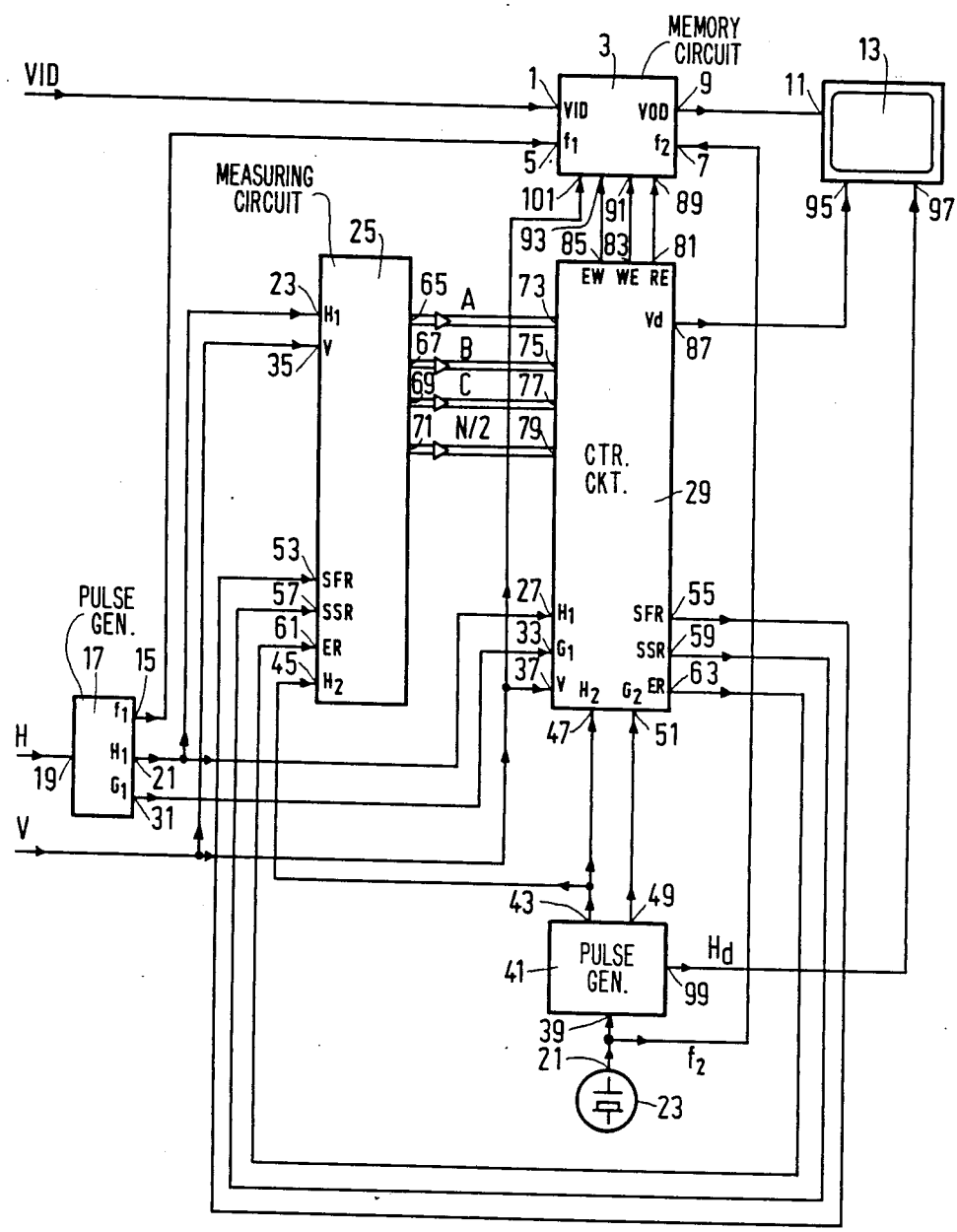
FIG. 3 illustrates by way of a concise block diagram a first possible embodiment of a field number doubling circuit according to the invention.

In FIG. 3 a television signal to be doubled in field number is applied in the form of video input data VID to an input 1 of a memory circuit 3. This signal is written in the memory circuit 3 by means of a write clock signal $f_1$ applied to an input 5 of the memory circuit 3, and further is supplied in the form of video output data VOD and doubled in field number from an output 9 of the memory circuit 3 by means of a read clock signal $f_2$ applied to an input 7 of the memory circuit 3 and is applied to an input 11 of a picture display section 13.

The write clock signal $f_1$ applied to the input 5 of the memory circuit 3 originates from an output 15 of a pulse generator 17 and is frequency and phase-coupled by means of a frequency divider and a phase-locked loop of this pulse generator 17 to a horizontal synchronizing signal H of the televsion signal to be doubled in field number which is applied to an input 19 of the pulse generator 17.

The read clock signal $f_2$ applied to the input 7 of the memory circuit 3 originates from an output 21 of a stable read clock signal generator 23 which is preferably crystal-controlled.

Furthermore, the pulse generator 17 supplies a horizontal synchronizing signal $H_1$ from an output 21 at the frequency of the horizontal synchronizing signal H of the television signal to be doubled in field number. This horizontal synchronizing signal $H_1$ is applied to an input 23 of a measuring circuit 25 and to an input 27 of a counter circuit 29. A further output 31 of the pulse generator 17 supplies a gating signal $G_1$ which determines the parts of the line periods of the television signal to be doubled in field number, in which parts this signal must be written in the memory circuit 3. This gating signal $G_1$ is applied to an input 33 of the counter circuit 29.

The measuring circuit 25 also has an input 35 to which a vertical synchronizing signal V is applied which is derived from the television signal to be doubled in field number, for example in a manner as described in Netherlands Patent Application No. 8401404 corresponding to U.S. Pat. No. 4,684,986 or in Netherlands Patent Application No. 8601062 corresponding to U.S. patent application Ser. No. 037,767, filed Apr. 13, 1987. This vertical synchronizing signal V is also applied to an input 37 of the counter circuit 29.

The output 21 of the clock signal generator 23 is also connected to an input 39 of a pulse generator 41 which supplies a horizontal display clock signal $H_2$ from an output 43 at the horizontal frequency of the television signal doubled in field number and which is applied to an input 45 of the measuring circuit 25 and to an input 47 of the counter circuit 29.

An output 49 of the pulse generator 41 applies a gating signal $G_2$ to an input 51 of the counter circuit 29, which signal determines the parts of the line periods of the television signal doubled in field number in which the signal must be read from the memory circuit 3.

The measuring circuit 25 receives a signal SFR at an input 53, which signal originates from an output 55 of the counter circuit 29 and which indicates the start of a first read operation of a field memory of the memory circuit 3, a signal SSR at an input 47, which signal originates from an output 59 of the counter circuit 29 and which indicates the start of a second read operation of a field memory of the memory circuit 3 and a signal ER at an input 61, which signal originates from an output 63 of the counter circuit 29 and which indicates the end of a read operation of a field memory of the memory circuit 3.

By means of the signals applied to its inputs 23, 35, 53, 57, 61 and 45, the measuring circuit 25 determines four values A, B, C and N/2 which are supplied from outputs 65, 67, 69, 71 and are applied to inputs 73, 75, 77, 79, respectively, of the counter circuit 29. The values A, B and N/2 correspond to those indicated in FIG. 1 and are measured in line periods of the television signal to be doubled in field number while the value C which is not indicated in FIG. 1 is a waiting period between the start of a read operation of a field memory and the start of a field display by the picture display section 13, expressed in a number of line periods of the field number doubled television signal.

By means of the signals applied to its inputs 51, 47, 37, 33, 27, 79, 77, 75 and 73, the counter circuit 29 renders the above-mentioned signals supplied from its outputs 55, 59 and 63, a read gating signal RE supplied from an output 81 thereof, a write gating signal WE supplied from an output 83 thereof, a signal EW supplied from an output 85 thereof indicating the end of a write operation, and a vertical display synchronizing signal $V_d$ supplied from an output 87 thereof which indicates the retract time of the vertical deflection of the picture display section 13. To this end, the outputs 81, 83, 85 of the counter circuit 29 are connected to inputs 89, 91, 93, respectively, of the memory circuit 3 and the output 87 of the counter circuit 29 applies the vertical display synchronizing signal $V_d$ to an input 95 of the picture display section 13 a further input 97 of which receives a horizontal display synchronizing signal $H_d$ from an output 99 of a pulse generator 41.

The memory circuit 3 also has an input 101 to which the vertical synchronizing signal V is applied.

Figure 4:
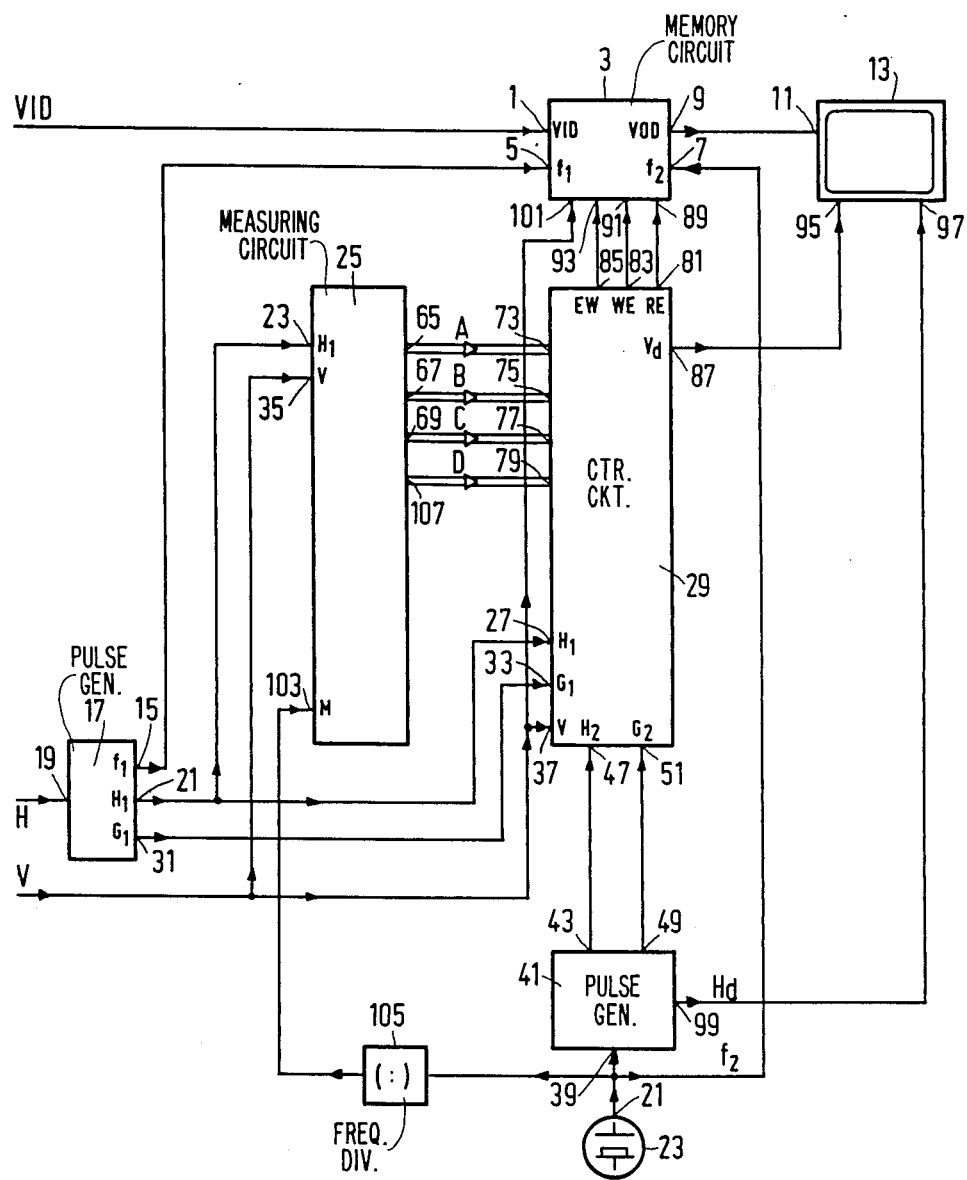
FIG. 4 illustrates by way of a concise block diagram a second possible embodiment of a field number doubling circuit according to the invention.

In FIG. 4 the structure of the counter circuit 29 slightly differs from that shown in FIG. 3, as will be explained hereinafter and it does not have outputs 55, 59, 63 for the signals SFR, SSR and ER. The measuring circuit 25 does not have inputs for these signals and instead of the input 45 for the horizontal display clock signal $H_2$, an input 103 is provided to which a measuring clock signal M is applied which is derived via a frequency divider 105 from the read clock signal $f_2$ originating from the output 21 of the read clock signal generator 23.

Instead of the output 71, the measuring circuit 25, which as will be described hereinafter differs from that shown in FIG. 3, has an output 107 from which the value D is supplied which is shown in FIG. 1 as the waiting period between two read operations of the memory circuit 3.

Figure 5:
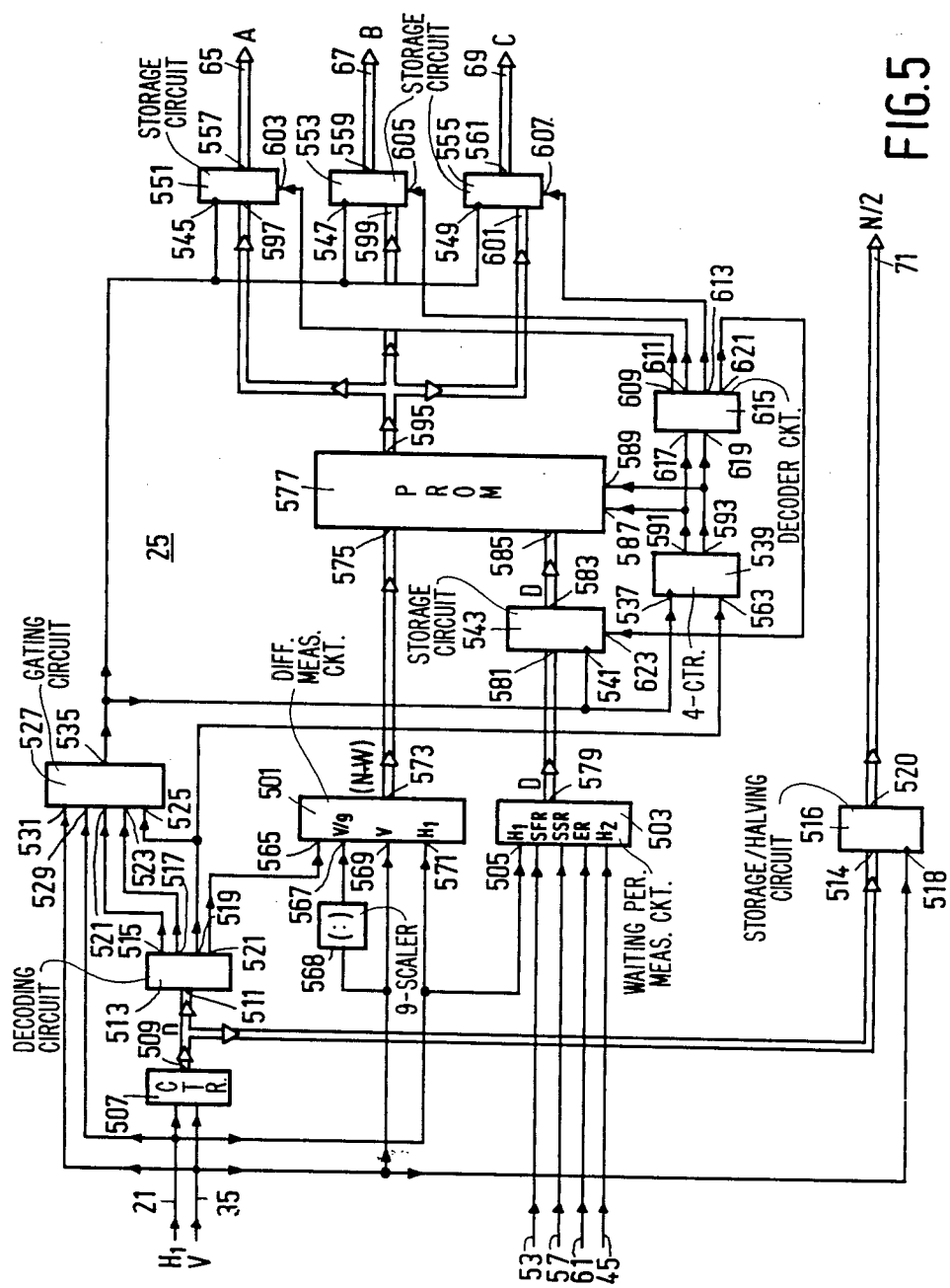
FIG. 5 illustrates by way of a block diagram a measuring circuit for a field number doubling circuit according to FIG. 3.
Figure 6:
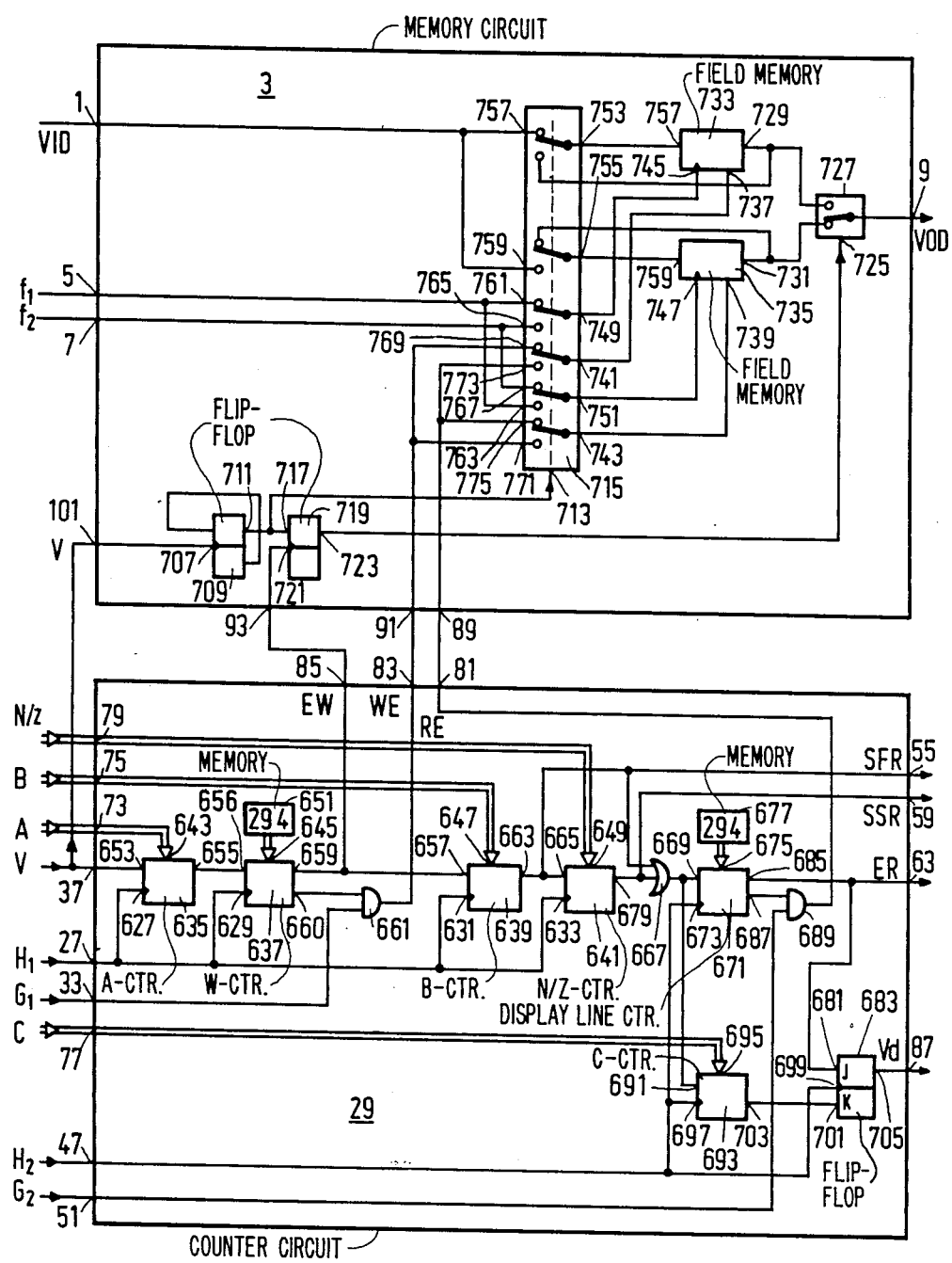
FIG. 6 illustrates by way of a block diagram a counter circuit for a field number doubling circuit according to FIG. 3 and a memory circuit for a field number doubling circuit according to FIG. 3 or FIG. 4.

FIG. 5 shows a possible embodiment of the measuring circuit 25 of FIG. 3 in which it will be assumed by way of a numerical example that the memory circuit 3 of FIG. 3, likewise as in FIG. 6, comprises two field memories each for storing information from 294 line periods of a field of the television signal to be doubled in field number, which signal has 312.5 line periods per field and 50 fields per second in its standard form.

The measuring circuit 25 of FIG. 5 uses the fact that the values of FIG. 1 can be expressed in the same units of time, in this case line periods of the television signal to be doubled in field number. As can be derived from FIG. 1, it then holds that $4R + 4D = 2N$ and hence $R = N/2 - D$ and $D = N/2 - R$ $W + B + R + D + R + B' = 2N$ from which, if B is rendered B' for obtaining the smallest possible value for the largest of these two units, it follows that $B = \frac{1}{2}(2N - W - 2R - D)$ and since $R = N/2 - D$ $B = \frac{1}{2}(N - W + D)$.

In this expression (N−W) is a value which indicates how much longer a field period takes as compared with a standard period, in this case a memory write period measured in write line periods. This measurement is performed by means of a difference measuring circuit 501.

The value (N−W) also indicates the maximum value which A may have if the condition is satisfied that a memory write operation must have been ended before the occurrence of a subsequent vertical synchronizing signal.

The value D is measured by means of a waiting period measuring circuit 503 based on the formula $D = N/2 - R$.

The difference measuring circuit 501 and the waiting period measuring circuit 503 will be described hereinafter with reference to FIG. 7.

The inputs 45, 61, 57 and 53 of the measuring circuit 25 of FIG. 5 are also inputs of the waiting period measuring circuit 503 which has a further input 505 which is connected to the input 21 for receiving the horizontal synchronizing signal $H_1$.

The inputs 21 and 35 of the measuring circuit 25 are also inputs of a counter 507 which is reset by the vertical synchronizing signal V and which counts the number of subsequently occurring horizontal synchronizing signals $H_1$ and supplies the value n of this number from its output and applies it to an input 511 of a decoding circuit 513 and to an input 514 of a storage and halving circuit 516 receiving the vertical synchronizing signal at its clock signal input 518 and supplying a measured value N/2 from its output 520 which is connected to the output 71 of the measuring circuit 25.

The decoding circuit 513 has a number of outputs 515, 517, 519, 521 at which a pulse successively occurs during the 130th, 131st, 253rd, 293rd line period, respectively, after each vertical synchronizing signal. The outputs 515, 517, 519 of the decoding circuit 513 are connected to inputs 521, 523, 525, respectively, of a gating circuit 527, further inputs 529 and 531 of which are connected to the inputs 21 and 35, respectively, of the measuring circuit 25. The gating circuit 527 supplies a pulse from an output 535 at the end of the 130th, 131st and 253rd line period and at the start of the occurrence of the signal V. This pulse signal at the output 535 of the gating circuit 527 is applied as a clock signal to an input 537 of a four-counter 539, to a clock signal input 541 of a storage circuit 543 and to clock signal inputs 545, 547, 549 of storage circuit 551, 553, 555, respectively which supply the values A, B, C from outputs 557, 559, 561 connected to the outputs 65, 67, 69, respectively, of the measuring circuit.

The four-counter 539 is reset each time at the end of the 253rd line period by the signal from the output 519 of the decoding circuit 513, which signal is applied to a reset input 563 of the four-counter 539.

The output 521 of the decoding circuit 513 applies a pulse to an input 565 of the difference measuring circuit 501, which pulse occurs each time at the end of the 293rd line period after a signal V. A further input 567 of the difference measuring circuit 501 is connected via a nine-scaler 568 to the input 35 of the measuring circuit 25 and receives a pulse V/9 after every nine pulses of the signal V. The signals V and $H_1$ at the inputs 35 and 21, respectively, of the measuring circuit 25 are applied to inputs 569 and 571, respectively, of the difference measuring circuit 501. An output 573 of the difference measuring circuit 501 supplies the value N−W to an input 575 of a programmable read-only memory 577.

The value D is obtained from an output 579 of the waiting period measuring circuit 503 and is applied to an input 581 of the storage circuit 543, and after each clock signal pulse at the input 541 thereof, it is supplied from an output 583 which is connected to an input 585 of the read-only memory 577. The read-only memory 577 also has two inputs 587, 589 which are connected to two outputs 591, 593 of the four-counter 539 and receives therefrom, the digital value zero, after the occurrence of the signal V, the digital value "one" after the end of the 130th line period, the digital value "two" after the end of the 131st line period and the digital value "three" after the end of the 253rd line period.

The read-only memory 577 is programmed in such a manner that it supplies the value $B=\frac{1}{2}(N-W+D)$ successively from a V pulse up to and including the 130th line period from an output 595 thereof under the influence of the signals at its inputs 575, 585, 587 and 589, the value C during the 131st line period and the value A during the 256th line period until the occurrence of the next V pulse, in which, for example $A=N-W-2$ and, for example $C=24-(N-W)$ for $N\leq312$ and for example $C=6$ and $A=16$ for $N<312$. In both cases is $C\geq22-2D$.

If a zoom circuit is also used, the read-only memory 577 must be switchable and should supply the value K instead of the value A in the case of zoom, while B must become $\frac{1}{2}(\frac{1}{2}N-W+D)$ as can be derived in a simple manner from FIG. 2. The value of zero or another desired constant value can then be taken for C.

The output 595 of the read-only memory 577 is connected to inputs 597, 599, 601 of the storage circuits 551, 553, 555, respectively, activating signal inputs 603, 605, 607 of which are connected to outputs 609, 611, 613, respectively, of a decoding circuit 615 whose inputs 617 and 619 are connected to the outputs 591 and 593, respectively, of the four-counter 539. A fourth output 621 of the decoding circuit 615 is connected to an activating signal input 623 of the storage circuit 543. The activating signals occur at such instants that the clock signals at the inputs 545, 547, 549 of the storage circuits 551, 553, 555, respectively, store the values A, B and C successively presented by the read-only memory in the relevent storage circuits 551, 553, 555, respectively.

The storage circuit 543 for the value D is activated at the end of a field period because the output value of the waiting period measuring circuit 503 may become available at the input 581 thereof at variable instants in the case of a combined field number doubling and zoom circuit. FIG. 6 shows an embodiment of the counter circuit 29 and the memory circuit 3.

The input 27 of the counter circuit 29 is connected to clock signal inputs 627, 629, 631, 633 of an A-counter 635, a W-counter 637, a B-counter 639, an N/2 counter 641, respectivley, and applies the horizontal synchronizing signal $H_1$ to these clock signal inputs.

Counting position inputs 643, 645, 647, 649 of the counters 635, 638, 639, 641 receive the values A, W which in this case is 294, B, N/2 respectively, from the input 73, a counting position memory 651, the input 75 and the input 79, respectively.

A starting signal input 653 of the A-counter 635 is connected to the input 37 and receives the vertical synchronizing signal V. Consequently at the next clock signal pulse $H_1$ the counting position A is written and the A-counter 635 supplies a pulse from an output 655 after A pulses $H_1$ during a clock signal period which lasts one line period, said pulse being applied to a starting signal input 657 of the W-counter 637 and thus starting A line periods after the A-counter 635 and then supplying the pulse EW during a line period after 294 line periods from an output 659, which pulse indicates the end of the write period W. This pulse EW is applied to the output 85 of the counter circuit 29 and to an input 657 of the B counter 639 which then starts.

A further output 660 of the W-counter 637 applies a logic "one" signal during the counting period of 294 line periods to an input of an AND gate 661, a further input of which receives the gating signal $G_1$ from the input 33 of the counter circuit 29. During this period, the AND gate 661 passes on the gating signal $G_1$ as a write gating signal WE to the output 83 of the counter circuit 29.

After the start of the B-counter, this counter runs B line periods and then supplies a pulse SFR during one line period from its output 663, which pulse is applied to the output 55 of the counter circuit 29, to a starting signal input 665 of the N/2 counter 641 and to an input of an OR gate 667. The OR gate 667 then supplies a starting signal for a first read operation to a starting signal input 669 of a display line counter 671 which receives at its clock signal input 673 the horizontal display clock signal from the input 47 of the counter circuit 29 and which receives at its counting position input 675 the value 294 of a counting position memory 677.

After N/2 line periods, the N/2-counter 641 supplies a pulse SSR during one line period from an output 679, which pulse is applied to the output 59 of the counter circuit 29 and to a further input of the OR gate 667 so that this gate applies a starting signal for a second read operation to the starting signal input 669 of the display line counter 671.

The display line counter 671 applies a pulse ER during a display line period at the end of a read operation to an output 685 connected to the output 63 of the counter circuit 29 and to a J output of a JK-flipflop 683. An output 687 of the display line counter 671 is high during the period of counting. This output 687 is connected to an input of an AND gate 689 a further input of which receives the gating signal $G_2$ from the input 51 of the counter circuit 29 so that the output of the AND gate 689 connected to the output 81 of the counter circuit 29 supplies the read gating signal RE.

The output of the OR gate 667 is also connected to a starting signal input 691 of a C-counter 693 whose counting position input 695 receives the value C from the input 77 of the counter circuit 29 and whose clock signal input 697 receives the horizontal display clock signal $H_2$ from the input 47 of the counter circuit 29, which display clock signal $H_2$ is also applied to a clock signal input 699 of the JK-flipflop 683. A K-input 701 of the JK-flipflop 683 is connected to an output 703 of the C-counter 693 so that the JK-flipflop 683 is reset at the end of a counting period of the C-counter 693. the JK-flipflop 683 is set at the end of a read period so that an output 705 of the JK-flipflop 683 connected to the output 87 of the counter circuit 29 each time supplies a pulse Vd which lasts from the end of a read operation until C line periods after the start of the next read operation and which determines the field retrace period of the picture display section 13.

The input 101 of the memory circuit 3 is connected to a clock signal input 707 of a D-flipflop 709 arranged as a two scaler whose Q output 711 is connected to a switching signal input 713 of a memory selection switch 715 and to a D-input 717 of a D-flipflop 719 a clock signal input 721 of which receives the end-of-writing signal EW from the input 93 of the memory circuit 3. The D-flipflop 719 supplies a switching signal from its Q-output 723, which signal is applied to a switching signal input 725 of a change-over switch 727. The inputs of the change-over switch 727 are connected to outputs 729 and 731 of field memories 733 and 735, respectively, of for example a charge-coupled type whose activating signal inputs 737 and 739 are connected to outputs 741 and 743, respectively, of the memory selection switch 715 and whose clock signal inputs 745 and 747 are connected to outputs 749 and 751, respectively, of the memory selection switch 715.

An output of the change-over switch 727 is also the output 9 of the memory circuit 3. Outputs 753 and 755 of the memory selection switch 715 are connected to inputs 757 and 759 of the field memories 733 and 735, respectively.

In the shown position of the memory selection switch 715 and the change-over switch 727, the field memory 733 is written with the video input data VID and the memory 735 is read twice to the output 9 of the memory circuit 3 and again written with video output data VOD.

The video input data VID is applied from the input 1 of the memory circuit 3 to inputs 575 and 759 of the memory selection switch 715 whose inputs 761 and 763 receive the write clock signal $f_1$ from the input 5 of the memory circuit 3 and whose inputs 765 and 767 receive the read clock signal $f_2$ from the input 7 of the memory circuit 3. Inputs 769 and 771 of the memory selection switch 715 receive the write gating signal WE from the input 91 of the memory circuit 3 and inputs 773 and 775 of the memory selection switch 715 receive the read gating signal RE from the input 89 of the memory circuit 3.

The change-over switch 727 changes its state at the end of a write operation and the memory selection switch 715 changes its state at the next V signal. Then the field memory 735 is written and the field memory 739 is read twice and again written with its output information.

If the circuit must not only be suitable for field number doubling but also for zoom display, the count circuit and the memory circuit must be adapted thereto in such a way that the write and read periods shown in FIG. 2 occur while furthermore a switch may be provided which must provide the possibility of the transfer of output information from one field memory to the input of the other field memory during the third read period, as is described in Netherlands Patent Application No. 8204728 (U.S. Pat. No. 4,604,651).

Figure 7:
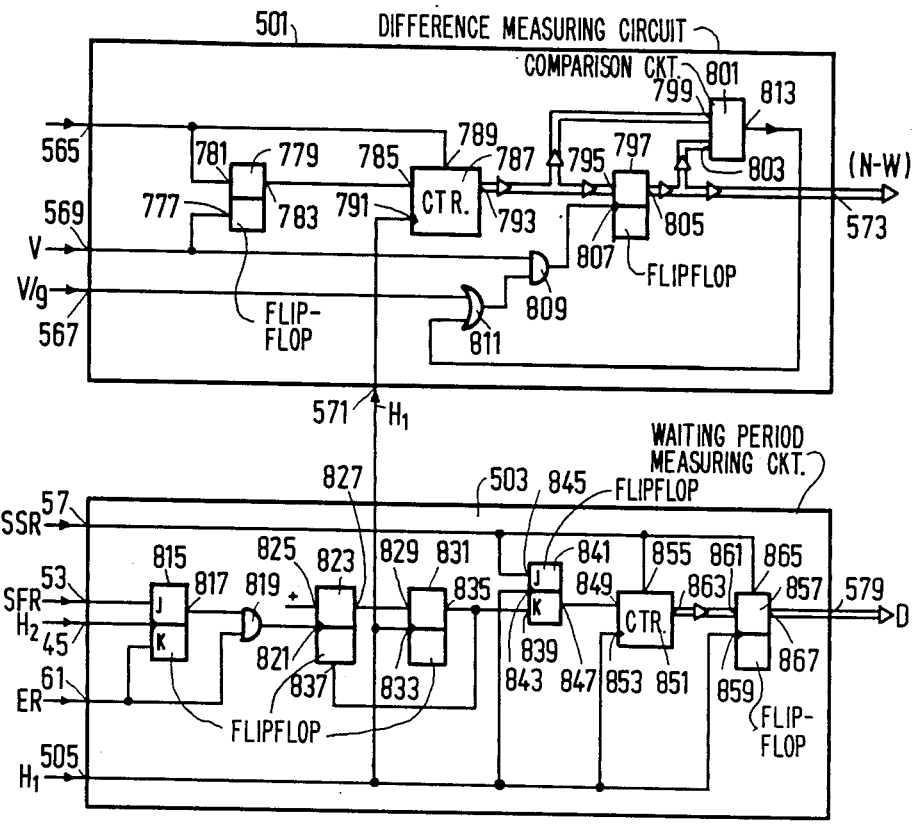
FIG. 7 illustrates by way of a block diagram a part of a measuring circuit according to FIG. 5.

FIG. 7 shows possible embodiments of the difference measuring circuit 501 and the waiting period measuring period 503 as may be used in the measuring circuit 25 of FIG. 5.

The input 569 of the difference measuring circuit 501 to which the vertical synchronizing signal V is applied is connected to a reset input 777 of a set-reset flipflop 779, a set input 781 of which receives the pulse occurring during the 293rd line period from the input 565 of the difference measuring circuit 501. At the end of this pulse, the flipflop 779 is set so that its output 783 becomes high and stays high until the next V pulse.

The output 783 of the flipflop 779 applies this output signal to an input 785 of a counter 787 a reset input 789 of which receives the same signal as the set input 781 of the flipflop 779. At the end of the 293rd line period, the counter 789 is thereby set to zero. A clock signal input 791 of the counter 787 receives the horizontal sychronizing pulses $H_1$ from the input 571 of the difference measuring circuit 501, which pulses are thus counted after the end of the 293rd line period until the next vertical pulse at which the counting position becomes one at the end of the 294th line period and the position $312-294=18$ is reached for the normal number of 312.5 lines per field. Generally, the counter 787 provides a counting position (N−W) at its output 793 after the occurrence of the last $H_1$ pulse before each V pulse.

This counting position is applied to an input 795 of a storage circuit 797 and to an input 799 of a comparison circuit 801 another input 803 of which is connected to an output 805 of the storage circuit 797, which output 805 is also connected to the output 573 of the difference measuring circuit 501.

A clock signal input 807 of the storage circuit 797 is connected to an output of an AND gate 809 an input of which receives the vertical synchronizing signal V from the input 569 of the difference measuring circuit 501 and another input of which is connected to an output of an OR gate 811 an input of which receives the signal V/9 from the input 567 of the difference measuring circuit 501. This signal V/9 is periodically low for eight field periods and high for one field period so that the AND gate 809 passes each ninth V pulse to the clock signal input 807 of the storage circuit 797 whose output 805 thus applies the value occurring at that moment after each ninth V pulse to the input 795. Another input of the OR gate 811 is connected to an output 813 of the comparison circuit 801 which supplies a logic "one" value is the value at the input 799 thereof is smaller than that at the input 803 so that the AND gate 809 passes the next V pulse to the clock signal input 807 of the storage circuit 797 and the new (N−W) value is stored therein and is supplied from the output 573 of the difference measuring circuit 501.

In the waiting period measuring circuit 503 the input 53 is connected to the J-input of a JK-flipflop 815 whose clock signal input receives the horizontal display clock signal $H_2$ from the input 45 of the waiting period measuring circuit 503 and whose K-input is connected to the input 61 of the waiting period measuring circuit 503. At the first pulse of the horizontal display clock signal $H_2$ after the start of the first read operation, an output 817 of the JK-flipflop 815 thereby becomes high and stays high until the end of the first pulse of the horizontal display clock signal $H_2$ after the end of a first read operation.

An AND gate 819, an input of which is connected to the output 817 of the JK-flipflop 815 and another input of which is connected to the input 61 of the waiting period measuring circuit 503, then supplies the end-of-reading signal ER at the end of the first read operation to a clock signal input 821 of a D-flipflop 823 whose D input 825 is high so that its output 827 becomes high and thus also a D input 829 of a D-flipflop 831 connected thereto. At the next horizontal synchronizing pulse $H_1$ which is applied from the input 505 of the waiting period measuring circuit 503 to a clock signal input 833 of the D-flipflop 831, an output 835 of this D-flipflop 831 becomes high and since it is connected to a reset input 837 of the D-flipflop 823, this flipflop is reset and the output 835 of the D-flipflop 831 becomes low again at the next horizontal synchronizing pulse $H_1$ at its clock signal input 833. The output 835 of the D-flipflop 831 is thus high at the end of the first read operation during one line period and so is a K-input 839 of a JK-flipflop 841 connected to this output 835, while a clock signal input 843 of this flipflop receives the horizontal synchronizing signal $H_1$ from the input 505 of the waiting period measuring circuit 503 and a J-input 845 receives the signal SSR occurring at the start of a second read operation from the input 57 of the waiting period measuring circuit 503.

An output 847 of the JK-flipflop 841 is then low during the number of line periods of the horizontal synchronizing signal $H_1$ elapsing between the end of the first read operation and the start of the second read operation. An activating signal input 849 of a counter 851 connected via an inverter to the output 847 of the JK-flipflop 841 is then high and the counter 851 counts the number of pulses $H_1$ which is applied to a clock signal input 853 connected to the input 505 of the waiting period measuring circuit 503. The counter 851 is set to zero again each time at the end of its counting period by means of the start-of-second-read signal SSR which is applied from the input 57 of the waiting period measuring circuit 503 to a reset input 855 thereof. Simultaneously, the final value of the counting position reached before this zero setting is taken over in a storage circuit 857, a clock signal input 859 of which is connected to the input 505 of the waiting period measuring circuit 503, an input 861 of which is connected to a counting position output 863 of the counter 851, an activating signal input 865 of which is connected to the input 57 of the waiting period measuring circuit 503, and an output 867 of which is connected to the output 579 of the waiting period measuring circuit 503.

Figure 8:
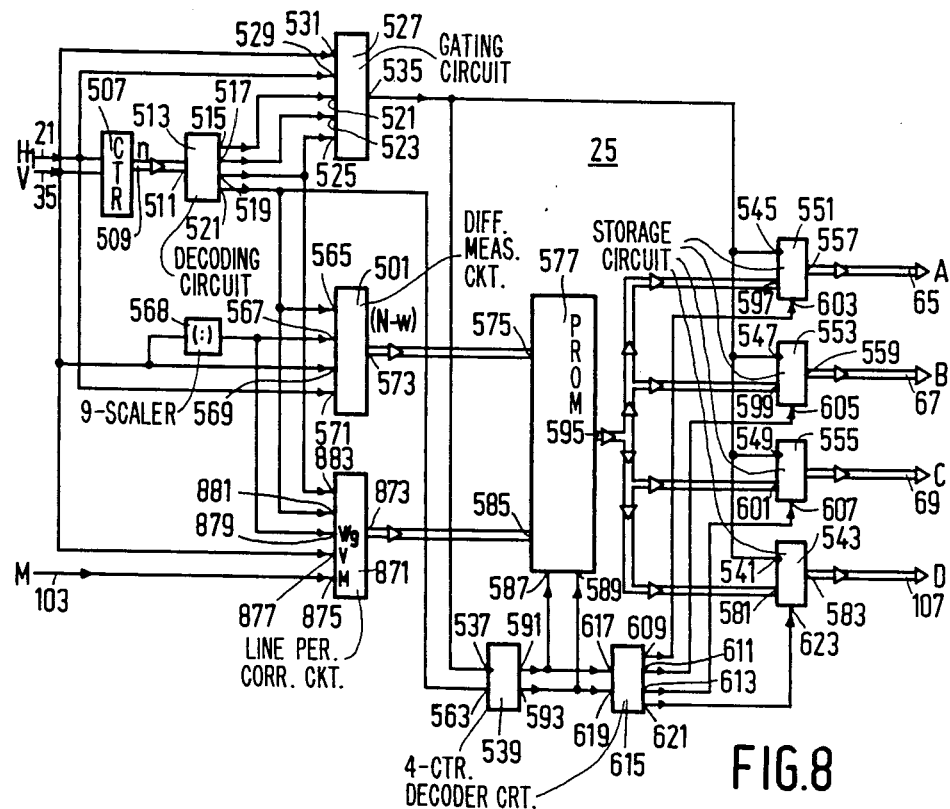
FIG. 8 illustrates by way of a block diagram a measuring circuit for a field number doubling circuit according to FIG. 4.

FIG. 8 shows a measuring circuit 25 for the field number doubling circuit of FIG. 4 for obtaining a value A which is expressed in line periods of the television signal, to be doubled in field number, likewise as in the measuring circuit 25 of FIG. 5 for the field number doubling circuit of FIG. 3, but in which an obtained value B is expressed in line periods of the field number doubled television signal. In connection therewith, the measuring circuit of FIG. 8 differs from that of FIG. 5 by the presence of a line period correction circuit 871 having an output 873 which is connected to the input 585 of the read-only memory 577, while the input 581 of the storage circuit 543 for the value D is now connected to the output 595 of the read-only memory 577 which must now be programmed in a manner different from that of FIG. 5. Furthermore, the reset input 563 of the four-counter 539 is now connected to the output 521 of the decoding circuit 513 and the output 583 of the storage circuit 543 is connected to the output 107 of the measuring circuit 25.

The line period correction circuit 871 has an input 875 which receives the measuring clock signal M from the input 103 of the measuring circuit 25, an input 877 which receives the vertical synchronizing signal V from the input 35 of the measuring circuit 25, an input 879 which receives the signal V/9 from an output of the nine-scaler 568, and inputs 881 and 883 which are connected to the outputs 521 and 519, respectively, of the decoding circuit 513. The operation of the line period correction circuit will be described with reference to FIG. 10.

Figure 9:
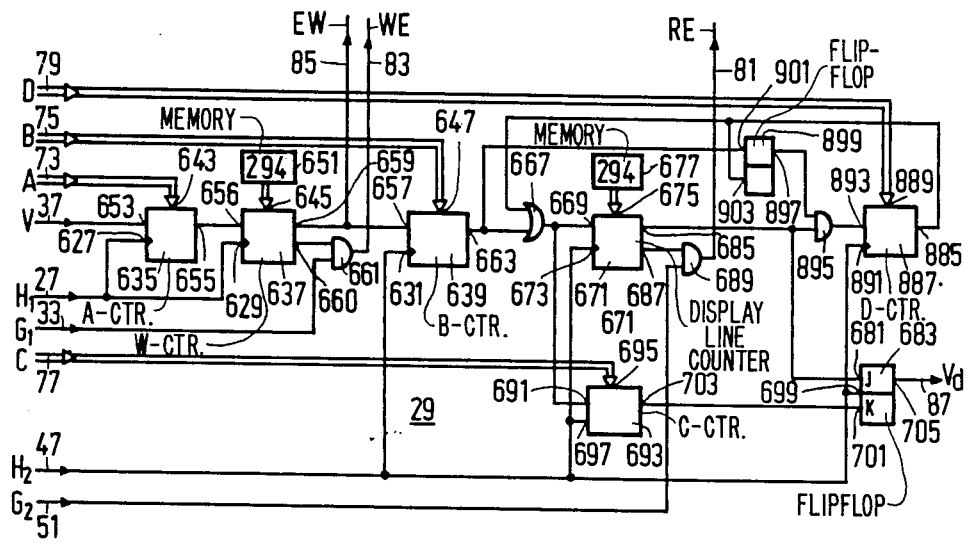
FIG. 9 illustrates by way of a block diagram a counter circuit for a field number doubling circuit according to FIG. 4.

FIG. 9 shows a possible embodiment of a counter circuit 29 of the field number doubling circuit of FIG. 4.

The circuit of the A-counter 635, the W-counter 637 and the AND gate is equal to that of the counter circuit of FIG. 6. In this case, the clock signal input 631 of the B-counter 639 is connected to the input 47 of the counter circuit 29 and thus now receives the horizontal display clock signal as a result of which the counting position input 647 of the B-counter 639 must now receive a B value which is adapted thereto.

As in the counter circuit of FIG. 6, the first start of the display line counter 671 is ensured via the OR gate 667 by the signal originating from the output 663 of the B-counter 639 at the end of a counting action thereof. The second start of the display line counter 671 is now ensured by the signal which is applied to the further input of the OR gate 667 and which originates from an output 885 of a D-counter 887, a counting position input 889 of which is connected to the D-input 79 of the counter circuit 29, a clock signal input 891 of which is connected to the input 47 for the horizontal display clock signal $H_2$ of the counter circuit 29 and a starting signal input 893 of which is connected to an output of an AND gate 895.

An input of the AND gate 895 is connected to the output 685 of the display line counter 671, a further input is connected to an output 897 of a set-reset flipflip 899, a set input 901 of which is connected to the output 663 of the B-counter 639 and a reset input 903 of which is connected to the output 885 of the D-counter 887 887 which supplies a pulse at the end of a counting action, which pulse resets the set-reset-flipflop 899 so that the AND gate 895 is inhibited. At the start of a first read operation, the set-reset flipflop 899 is set so that the AND gate 895 can then pass the signal from the output 685 of the display line counter 671 to the starting signal input 893 of the D-counter 887.

Figure 10:
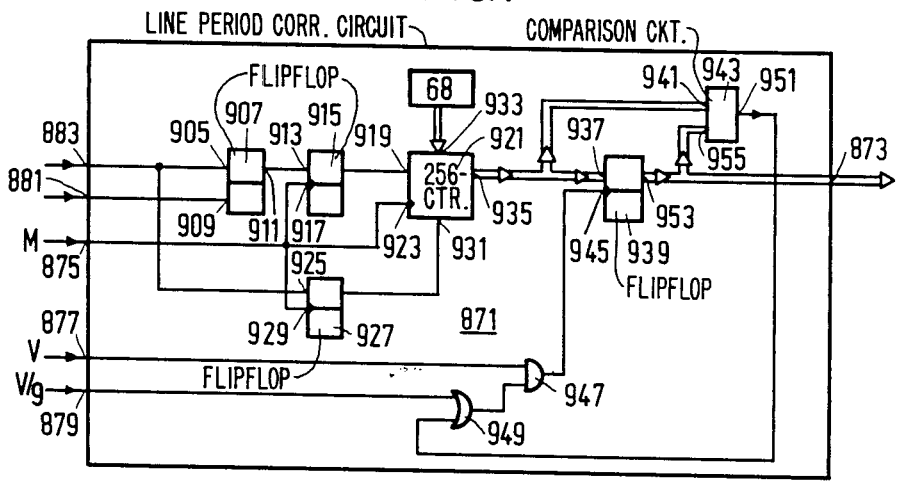
FIG. 10 illustrates by way of a block diagram a part of a measuring circuit according to FIG. 8.

The waiting periods B and D are now counted by the counters 639 and 887, respectively, in line periods of the field number doubled television signal for which, as already indicated hereinbefore, the line period correction circuit 871 of FIG. 10 is required in the measuring circuit 29 of FIG. 8 for the field number conversion circuit of FIG. 4. The value of the desired correction can be calculated as follows:

As indicated above, FIG. 1 shows that $$B = N - \tfrac{1}{2}W - R - D$$

and $$D = \tfrac{1}{2}N - R$$

from which it follows that $$B = \tfrac{1}{2}(N-W) + \tfrac{1}{4}W - \tfrac{1}{2}R.$$

It appears from the description of the counter circuit of FIG. 9 that B and D are counted in line periods of the field number doubled television signal, while the difference measuring circuit 501 of FIG. 7 measures the value (N−W) in line periods of the television to be doubled in field number. In the above-mentioned formulas, a correction must therefore be provided for the line periods in which N and W are expressed and which $$2\left(1 - \frac{\Delta f}{f}\right)$$

times as long as those in which B, D and R are expressed in which $\Delta f/f$ is the relative deviation from the line frequency of the television signal to be doubled in field number with respect to 2 x the line frequency of the field number doubled television signal.

If this correction is introduced in the above-mentioned formula, this yields $$B = 3/4(N-W).2.\left(1 - \frac{\Delta f}{f}\right) +$$

$$1/4\, W.2.\left(1-\frac{\Delta f}{f}\right) - \tfrac{1}{2}R$$

$$= 3/2(N-4) + W(-3/2N)\frac{\Delta f}{f}$$

For the above-described example in which $N \approx 312$, $R=294$ and $W=294$ this will be $$B = 3/2\,(N-W) - 174\frac{\Delta f}{f}$$

A relative frequency deviation $\Delta f/f = 0.0032$ corresponds for a number of 312.5 lines per field to be a deviation of 1 line period per field so that, if the deviation $\Delta f/f$ is expressed in x line periods per field:

$$B = 3/2(N-W) = 174 \cdot 0.0032x = 3/2(N-W) - 0.5x$$

and $$D = \tfrac{1}{2}(N-W).2.\left(1 - \frac{\Delta f}{f} + \tfrac{1}{2}W.2.\left(1-\frac{\Delta f}{f}\right) - R\right.$$

$$= N - W - N\frac{\Delta f}{f} = N - W - x$$

The value of x is determined as follows with the line period correction circuit 871 of FIG. 10.

A set input 905 of a set-reset flipflop 907 receives from the input 883 the pulse which occurs during the 253rd line period, while a reset input 909 of the flipflop 907 receives from the input 881 the pulse which occurs during the 293rd line period. An output 911 of the flipflop 907 is then high during 39 line periods.

A D-input 913 of a D-flipflop 915 receives this signal from the output 911 of the flipflop 907 and synchronizes this signal with the measuring clock signal M of 1 MHz which is applied to a clock signal input 917 of the D-dlipflop 915 and which originates from the input 875 of the line period correction circuit 871. The synchronized output signal of the D-flipflop 915 is applied to an activating signal input 919 of a 256-counter 921 a clock signal input 923 of which is connected to the measuring clock signal input 875 of the line period correction circuit 871.

A D-input 925 of a further D-flipflop 927 receives the pulse occurring during the 253rd line period from the input 883 of the line period correction circuit 871 and synchronizes this pulse with the measuring clock signal M applied to a clock signal input 929 of the D-flipflop 927 and originating from the input 875 of the line period correction circuit 871. The synchronized output signal of the D-flipflop 927 is applied to a write signal input 931 of the 256-counter 921 which then writes the values 68 applied to a counting position input 933 thereof and further counts the number of pulses of the 1 MHz measuring clock signal M during 39 line periods. At the standard line frequency, 64 pulses are counted per line period, hence $39 \times 64 = 2496$ pulses per measuring cycle. Since the starting position of the 256-counter is 68, the nominal end position becomes $$\frac{2495-68}{256}$$

modulo 256 is 123. A relative deviation from the line frequency of 0.0032 produces a deviation of 8 for the number of 2496 pulses. The number of times 8 which the counting position thus deviates from 123 is consequently the desired line period correction x. If the three least significant bits of the counting position are not used at the end of a measuring cycle, the nominal counting position is $$\frac{123}{8}. = 15$$

and the difference with respect to 15 results in the value of x. This means that x=the counting position at the end of a measuring cycle minus 15. The counting position is obtained from an output 935 of the 256-counter 921 and is applied to an input 937 of a storage circuit 939 and to an input 941 of a comparison circuit 943.

A clock signal input 945 of the storage circuit 939 is connected to the output of an AND gate 947 an input of which is connected to the input 877 of the line period correction circuit 871 and which receives the vertical synchronizing signal V and another input of which is connected to the output of an OR gate 949. An input of the OR gate 949 is connected to the input 879 of the line period correction circuit 871 and receives the signal V/9 whilst another input is connected to an output 951 of the comparison circuit 943.

An output 953 of the storage circuit 939 is connected to the output 873 of the line period correction circuit 871 and to a further input 955 of the comparison circuit 943. The output 951 of the comparison circuit 943 becomes high when the value at its input 941 becomes smaller than that at its input 955 so that the AND gate 947 passes the next V pulse to the clock signal input 945 of the storage circuit 939. Furthermore, the AND gate 947 passes each V pulse coinciding with the V/9 signal to the clock signal input 945 of the storage circuit 939. The value at the output 953 of the storage circuit 939 is thus replenished at a very ninth V pulse and also when the line period becomes at least 0.32% shorter.

In the embodiments described above, both the value of B and that of D were controlled. If memories of a random access type instead of a charged-coupled type are used in the memory circuit 3, the control of the B value may be omitted, if desired.

In principle it is sufficient then to have an N/2 control in the case of FIG. 5, that is to say a control from the period between the start of two read operations of the memory circuit for which then only a N/2 measurement or an (N−W) measurement is required. In that case a control of the C value is neither necessary so that the feedback of the D value to the read-only memory 577 can be dispensed with.

In addition to the above-mentioned possibilities of controlling the B value when using charge-coupled memories, it is also possible to use a counter circuit with a B-counter and a B'-counter and, starting from a given starting position of one of these counters, to provide a control which renders the counting positions of these counters equal by controlling the waiting period B, while also at least the D-value is controlled, in for example, one of the two manners indicated.

Although a time multiplex read-only memory 577 is used in the embodiments shown, separate read-only memories for obtaining the values A, B, C, D, or calculation circuits for the relevant formulas may alternatively be used for these values.

What is claimed is:

1. A field number doubling circuit for a television signal, comprising a memory circuit which can be written at the field frequency of the television signal to be doubled in field number and can be read at the double field frequency thereof, vertical synchronizing signal ($V_d$) for a picture display section for displaying a field number doubled television signal being derived by means of a controllable counter circuit from vertical synchronizing signals (V) of the television signal to be doubled in field number for obtaining a vertical synchronizing signal pattern in which a vertical frequency component of the television signal to be doubled in field number is reduced, characterized in that the counter circuit comprises at least one counter which is controllable by means of a measuring circuit for obtaining a delay (N/2) between the start of a first read operation and the start of a second read operation which is substantially equal to half the field period of the television signal to be doubled in field number, while the measuring circuit is adapted to measure at least the duration (N) of the fields of the television signal to be doubled in field number or the difference (N-W) of the duration thereof with respect to a standard duration and to derive a value (N+/2, D) therefrom for the control of the controllable counter and to apply said value to said counter.

2. A field number doubling circuit as claimed in claim 1, characterized in that the controllable counter is a counter which can be started by a starting signal from a first read operation and which receives a value from the measuring circuit, which value corresponds to half the field period (N/2).

3. A field number doubling circuit as claimed in claim 1, characterized in that the controllable counter is a counter which can be started by an end signal of a first read operation and which receives a value (D) from the measuring circuit, which value corresponds to half the field period minus one read period.

4. A field number doubling circuit as claimed in claim 1, characterized in that the controllable counter circuit comprises a counter which is controllable by means of the measuring circuit for obtaining a delay (A), which is controllable by the measuring circuit, between the occurrence of a vertical synchronizing signal and the start of a write operation of the memory circuit.

5. A field number doubling circuit as claimed in claim 1, characterized in that the controllable counter circuit comprises a counter which is controllable by means of the measuring circuit for obtaining a delay (C), which is controllable by means of the measuring circuit, between the start of a memory read operation and the start of a vertical deflection of the picture display section.

6. A field number doubling circuit as claimed in claim 1, characterized in that the controllable counter circuit also comprises a counter, which is controllable by means of the measuring circuit, for obtaining a delay (B) between the end of a write operation and the start of a first read operation, which delay is substantially equal to the delay (B') between a last read operation and the next write operation.

7. A field number doubling circuit as claimed in claim 1, characterized in that the measuring circuit comprises an n-counter for counting the number (n) of horizontal synchronizing signal pulses ($H_1$) of the television signal to be doubled in field number occurring after a vertical synchronizing signal pulse (V), while a decoding circuit and a difference measuring circuit are coupled to an output of the n-counter for measuring the average deviation (N−W) of the number of line periods (N) per field of the television signal to be doubled in field number with respect to a standard number (W).

8. A field number doubling circuit as claimed in claim 7, characterized in that the measuring circuit comprises a line period correction circuit for measuring the deviation of the average line period of the television signal to be doubled in field number with respect to a standard value.

9. A field number doubling circuit as claimed in claim 7, characterized in that a storage and halving circuit is coupled to an output of the n-counter (507) for obtaining a value (N/2) which is equal to half a number of line periods per field.

10. A field number doubling circuit as claimed in claim 4, characterized in that the measuring circuit commprises a waiting period measuring circuit for measuring the waiting period (D) between the end of a first read operation and the start of a second read operation of the memory circuit.

* * * * *